United States Patent [19] | [11] 4,389,902
Kataoka et al. | [45] Jun. 28, 1983

[54] FLOW RATE TRANSDUCER

[75] Inventors: Masami Kataoka, Kariya; Nobumasa Higo, Toyota, both of Japan

[73] Assignee: Nippondenso Co., Ltd., Kariya, Japan

[21] Appl. No.: 256,831

[22] Filed: Apr. 23, 1981

[30] Foreign Application Priority Data

Apr. 25, 1980 [JP] Japan ............ 55-55739

[51] Int. Cl.³ ............ G01F 1/075; G01F 15/06

[52] U.S. Cl. ............ 73/861.77; 73/861.87; 250/239

[58] Field of Search ............ 73/861.77, 861.87, 861.78; 324/175; 250/231 SE, 239

[56] References Cited

U.S. PATENT DOCUMENTS

| | | | |
|---|---|---|---|
| 2,723,562 | 11/1955 | Lutz et al. | 73/861.77 |
| 3,167,658 | 1/1965 | Richter | 250/239 |
| 3,217,539 | 11/1965 | Owen et al. | 73/861.77 |
| 3,792,610 | 2/1974 | Kountanis et al. | 73/861.77 |
| 3,867,840 | 2/1975 | Baatz . | |
| 3,942,112 | 3/1976 | Westbrook | 324/175 X |
| 4,011,757 | 3/1977 | Baatz . | |
| 4,047,106 | 9/1977 | Robinson | 324/175 |
| 4,190,767 | 2/1980 | Crouse | 250/239 X |
| 4,309,605 | 1/1982 | Okabe | 250/239 |
| 4,317,032 | 2/1982 | Hanus et al. | 250/239 X |

OTHER PUBLICATIONS

Holdaway et al.-IBM Technical Disclosure Bulletin, vol. 17, No. 11, Apr. 1975, p. 3200.

*Primary Examiner*—Charles A. Ruehl
*Attorney, Agent, or Firm*—Cushman, Darby & Cushman

[57] ABSTRACT

In a flow rate transducer of the type arranged to detect the rotational speed of a blade wheel by transmitting a light beam from one side thereof to the other, a printed circuit board for carrying thereon a light-emitting element and a light-receiving element is provided. The light-emitting element and the light-receiving element are received in recessed portions of a casing made of a transparent material, where all parts including the printed circuit board contained in the casing are fixedly supported by a synthetic resin filling. The optical axes of the light-emitting element and the light-receiving element can be readily adjusted to align before assembled in the casing. The size and shape of the recessed portions may be arranged to correspond to the size and shape of the corresponding light-emitting element and the light-receiving element so that optical axes alignment can be automatically performed when fitted therein.

21 Claims, 11 Drawing Figures

26 21 22 20 27 15 40 3 10 13a 28 14 19a 18 19b 2 11a 23 50 16 17 25 42 II II' 12a 3L 2L 9 1a 11b 5 6 7 24 4 8 29 32 31 30

FLOW RATE TRANSDUCER

BACKGROUND OF THE INVENTION

This invention generally relates to a flow rate transducer or detector which produces an electrical signal indicative of flow rate of fluid, such as fuel for internal combustion engine for vehicles, and more particularly, the present invention relates to a flow rate transducer of the type arranged to produce an intermittent signal by transmitting a light beam through a rotating member which rotates at a speed substantially the same as the fluid.

Generally speaking, in conventional flow rate transducers of the above-mentioned sort, an impeller or a blade wheel is rotatably mounted in a fluid chamber in such a manner that it rotates at a rotational speed substantially the same as the speed of fluid flow, and a light beam is arranged to pass through a given point of the locus of the blade wheel so that a pulsating signal will be produced since the light beam is intermittently received by a photosensitive element. Various conventional flow rate transducers of this sort can be divided into two types. Namely, in the first type, a light-emitting element, such as a light-emitting diode or a lamp, and a light-receiving element, such as a phototransistor, are both located at one side of the blade wheel, while a reflector is located at the other side to reflect the light beam from the light-emitting element. The light-emitting element and the light-receiving element as well as the reflector are isolated from fluid rotating the blade wheel, and suitable windows made of a transparent material for transmitting the light beam are provided in front of the light-emitting element and the light-receiving element and also in front of the reflector. In the second type, no reflector is used. Namely, a light-emitting element and a light-receiving element are respectively located at both sides of a blade wheel so that the light-receiving element directly receives the light beam from the light-emitting element. Similar windows are also provided in this second type.

The above-described conventional flow rate transducers have suffered hitherto a problem in connection with work for optical axes alignment. In both of the above-described conventional flow rate transducers, it is essential that the optical axes have to be aligned. In detail, in the first type, the position and the inclination angle of the light-emitting element have to be adjusted so that the light beam therefrom hits a predetermined position of the reflector; the inclination angle of the reflector has to be adjusted so that the light beam reflected thereat is properly transmitted to the light-receiving element, and the position and inclination angle of the light-receiving element have to be adjusted so that the optical axis thereof accords with the reflected light beam. Similarly, in the second type, the optical axes of the light-emitting element and the light-receiving element having to be aligned. Such optical axes alignment is essential for ensuring the light beam a correct propagation through the windows. However, this work for optical axes alignment has been troublesome and time-consuming hitherto because such adjustments for optical axes alignment had to be performed after the above-mentioned various elements have been incorporated in or assembled with the body or housing of the flow rate transducer.

SUMMARY OF THE INVENTION

The present invention has been developed in order to remove the above-mentioned disadvantage and drawback inherent to the conventional flow rate transducers.

It is, therefore, an object of the present invention to provide a new and useful flow rate transducer so that optical axes alignment can be readily performed within a short period of time.

According to a feature of the present invention, light-emitting and light-receiving elements are both mounted on a printed circuit board, having a given space therebetween so that a light beam from the light-emitting element will pass through a given portion of a rotary blade wheel when incorporated in a body of a flow rate transducer. With this arrangement, the position and inclination angle of each of the light-emitting element and the light-receiving element can be readily adjusted before the printed circuit board is assembled with the body. Each of the light-emitting element and the light-receiving element is fitted in a suitable recessed portion of a casing, and the size and shape of each of the recessed portions may be arranged to correspond to those of each of the light-emitting element and the light-receiving element. By employing such recessed portions of the casing, the inclination angle of each of the light-emitting element and the light-receiving element is automatically adjusted so that the optical axes thereof accord with each other.

The above described feature may be adopted to a flow rate transducer of the type arranged to reflect the light beam from the light-emitting element as will be apparent from the following description.

In accordance with the present invention there is provided a flow rate transducer for producing an electrical signal indicative of flow rate of fluid, comprising: (a) a housing defining a fluid chamber which communicates with an inlet passage and with an outlet passage; (b) a blade wheel rotatably mounted in said fluid chamber, and having a plurality of light-shielding plates; (c) a light-emitting element arranged at one side of a given point of the locus of said light-shielding plates; (d) a light-receiving element arranged at the other side of said given point of said locus; (e) means for carrying said light-emitting element and said light-receiving element thereon; and (f) a casing having two recessed portions for respectively receiving said light-emitting element and said light-receiving element therein, each of said recessed portions having a transparent portion so that light transmission from said light-emitting element to said light-receiving element is effected therethrough, said casing being fixedly connected to the carrying means, and being embedded in a bore made in said housing.

In accordance with the present invention there is also provided a flow rate transducer for producing an electrical signal indicative of flow rate of fluid, comprising: (a) a housing defining a fluid chamber which communicates with an inlet passage and with an outlet passage; (b) a blade wheel rotatably mounted in said fluid chamber, and having a plurality of light-shielding plates; (c) a light-emitting element arranged at one side of a given point of the locus of said light-shielding plates; (d) a light-receiving element arranged at the other side of said given point of said locus; (e) means for carrying said light-emitting element and said light-receiving element thereon; and (f) a casing having two recessed portions for respectively receiving said light emittingelement and said light-receiving element therein, each of said recessed portions having a transparent portion so that light transmission from said light-emitting element to said light-receiving element is effected therethrough, said casing being fixedly connected to the carrying means, and being embedded in a bore made in said housing, each of said recessed portions having an inner shape and size corresponding to the outer shape and size of each of said light-emitting element and said light-receiving element so that the vertical and horizontal inclination angles of each of these elements are defined when fitted therein.

In accordance with the present invention there is further provided a flow rate transducer for producing an electrical signal indicative of flow rate of fluid, comprising: (a) a housing defining a fluid chamber which communicates with an inlet passage and with an outlet passage; (b) a blade wheel rotatably mounted in said fluid chamber, and having a plurality of light-shielding plates; (c) a light-emitting element arranged at one side of a given point of the locus of said light-shielding plates; (d) a light-receiving element arranged adjacent to said light-emitting element; (e) means for reflecting a light beam from said light-emitting element so that the reflected light beam is received by said light-receiving element; (f) means for carrying said light-emitting element, said light-receiving element and the reflecting means thereon; and (g) a casing having two recessed portions for respectively receiving, in the first recessed portion, said light-emitting element and said light-receiving element, and in the second recessed portion, said reflecting means, each of said recessed portions having a transparent portion so that light transmission from said light-emitting element via said reflecting means to said light-receiving element is effected therethrough, said casing being fixedly connected to the carrying means, and being embedded in a bore made in said housing.

BRIEF DESCRIPTION OF THE DRAWINGS

The object and features of the present invention will become more readily apparent from the following detailed description of the preferred embodiments taken in conjunction with the accompanying drawings in which.

In the drawings, the same or corresponding elements are designated at like numerals.

DETAILED DESCRIPTION OF THE PREFERRED EMBODIMENTS

Figure 1:
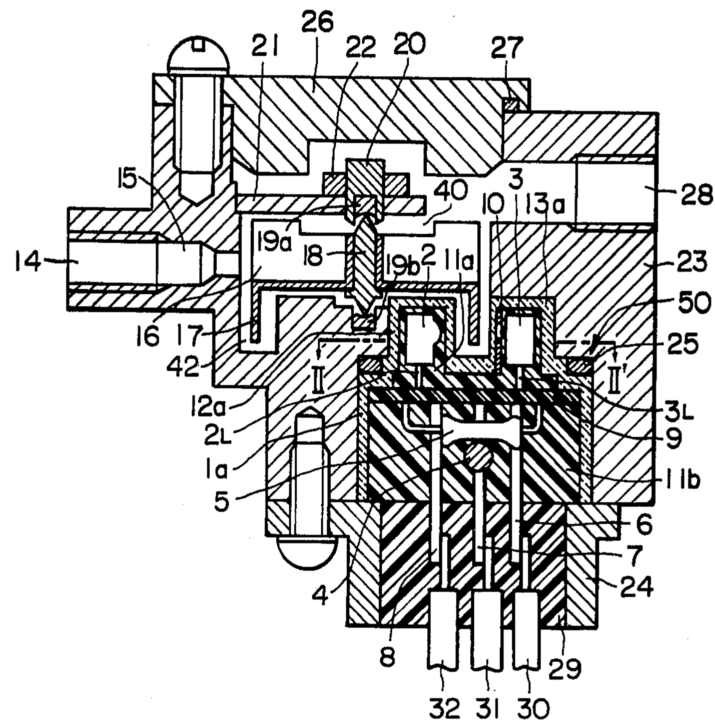
FIG. 1 is a schematic cross-sectional front view of a first embodiment of the flow rate transducer according to the present invention.
Figure 3:
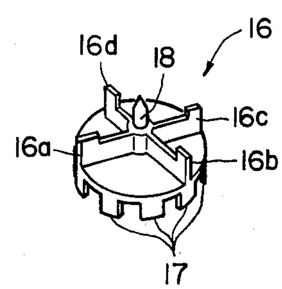
FIG. 3 is a schematic perspective view of the blade wheel of FIG. 1.

FIG. 1 illustrates a cross-sectional front view of a first embodiment of the flow rate transducer according to the present invention. The transducer of FIG. 1 generally comprises a body 23, a top lid 26, an electrical circuit portion (no numeral) contained in a casing 1, and a fixing plate 24. The top lid 26 and the body 23 constitute a housing of the flow rate transducer. A fluid inlet passage 14 is provided at the left in the drawing, while a fluid outlet passage 28 is provided at the right of the same. These passages 14 and 28 will be respectively connected, in operation, to suitable conduits (not shown) so that fluid, such as gasoline, comes into the inlet passage 14 and leaves through the outlet passage 28. The inlet passage 14 is tapered at its right end so as to constitute a throttle nozzle 15. The throttle nozzle 15 communicates with a fluid chamber 40 in which a blade wheel or impeller 16 is rotatably mounted. The fluid chamber 40 then communicates with the outlet passage 28 at the other end. The blade wheel 16 has a rotary center shaft 18 interposed between two bearings *19a* and *19b* respectively located at the top and the bottom of the fluid chamber 40. The lower bearing *19b* is received in a recess made at the bottom of the fluid chamber 40, while the top bearing *19a* is received in a recess made in a thrust adjusting screw 20 which is fixed by means of a lock nut 22 to a supporting plate 21. The blade wheel 16 comprises a plurality of blades *16a, 16b, 16c* and *16d* as best seen in FIG. 3, and a plurality of light-shielding plates 17. The blades *16a* to *16d* radially extend from the rotary center shaft 18, while the light-shielding plates 17 are arranged along the circumference of the blade wheel 16 and extend axially, namely, in parallel to the center shaft 18. The fluid chamber 40 comprises an annular recess 42 at the bottom thereof, where the annular recess 42 is coaxial with the rotary center shaft 18. The blade wheel 16 is mounted in the fluid chamber 40 in such a manner that the light-shielding plates 17 of the blade wheel 16 are received in the annular recess 42 without coming into contact with the walls thereof.

The above-mentioned top lid 26 is tightly fixed to the body 23 by means of screws, where a packing 27 interposed between the top lid 26 and an upper portion of the body 23 is arranged to be compressed so as to seal the fluid in the housing of the flow rate transducer.

The above-mentioned electrical circuit portion comprises a printed circuit board 9, various electrical parts including a light-emitting element 2, such as an ultraviolet light-emitting diode, and a light-receiving element 3, such as a phototransistor, and a casing *1a* covering the electrical circuit portion. In detail, the light-emitting element 2 and the light-receiving element 3 are respectively mounted on the printed circuit board 9 with a predetermined space therebetween in such a manner that these elements 2 and 3 face each other. A slit plate 10 is placed in front of the light-receiving element 3.

Figure 2:
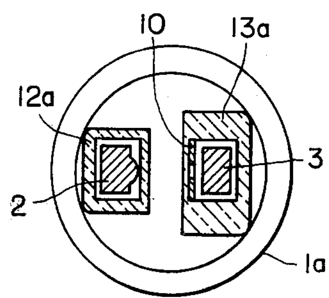
FIG. 2 is a schematic cross-sectional view of the electrical circuit portion in a first embodiment flow rate transducer, taken along a line II–II' of FIG. 1.

The positional relationship between the light-emitting element 2 and the light-receiving element 3 is also seen in FIG. 2 which is a cross-sectional view of the first embodiment of FIG. 1 taken along a line II–II'. The reference numerals 4 and 5 of FIG. 1 respectively indicate resistors fixed to the other or rear side of the printed circuit board 9, and unshown other parts are also fixed to the printed circuit board 9. Three terminal strips 6, 7 and 8 are extending downward from the rear surface of the printed circuit board 9, and these terminals 6 to 8 are respectively connected to leads 30, 31 and 32.

Figure 4:
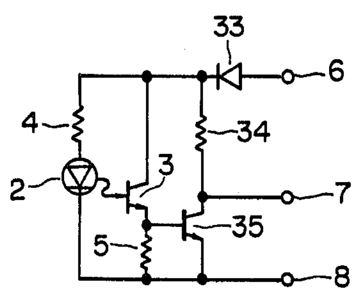
FIG. 4 is a circuit diagram of the electrical circuit mounted on the printed circuit board of FIG. 1.

FIG. 4 shows a circuit diagram of the electrical circuit mounted on the printed circuit board 9. The above-mentioned light-emitting element 2 is shown as a light-emitting diode 2, while the light-receiving element 3 is shown as a phototransistor 3, and additional parts, i.e. a diode 33, a resistor 34 and a transistor 35, are also shown. The circuit arrangement of FIG. 4 is substantially the same as conventional one, and therefore, detailed description of the structure thereof is omitted. The three terminals 6 to 8 are to be respectively connected to the leads 30 to 32 as described in the above. The leads 30 and 32 are respectively connected to positive and negative or ground terminals of an unshown power supply, while the lead 31 is used for deriving an output pulsating signal as will be described hereinafter.

Turning back to FIGS. 1 and 2, the electrical circuit portion is covered by the casing 1*a* which is made of a transparent material, such as a synthetic resin. The casing 1*a* is of generally cylindrical shape, and has an open end at its bottom. At the top of the cylindrical casing 1*a* are formed two recessed portions 12*a* and 13*a*. Each of the recessed portions 12*a* and 13*a* has a U-shaped cross-section when viewed from the front as shown in FIG. 1, and also has a rectangular cross-section when viewed from the top as shown in FIG. 2. Each of the light-emitting element 2 and the light-receiving element 3 is received or fitted in each of the recessed portions 12*a* and 13*a*. The slit plate 10 is also received in the recessed portion 13 in such a manner that the light-receiving element 3 can properly receive a light beam from the light-emitting element 2 transmitted through the transparent walls of the recessed portions 12*a* and 13*a*. Namely, the light-emitting element 2 and the light-receiving element 3 face each other so that the emitted light beam from the light-emitting element 2 directly propagates to the light-receiving element 3 when nothing shielding the light is located between the light-emitting element 2 and the light-receiving element 3. The recessed portions 12*a* and 13*a* are spaced by a predetermined distance where this space substantially corresponds to the width of the above-mentioned annular recess 42 made at the bottom of the fluid chamber 40.

When manufacturing the electrical circuit portion, the transparent casing 1*a* will be mounted on the printed circuit board 9 after necessary alignment of optical axes of the light-emitting element 2 and the light-receiving element 3 has been completed. In detail, after all electrical parts of FIG. 4 are mounted on the both sides of the printed circuit board 9 and the terminals 6 to 8 are respectively connected to the leads 30 to 32, a test for adjusting the optical axes is effected by making the light-emitting element 2 emit a light beam. Although the light-emitting element 2 and the light-receiving element 3 are mounted on the printed circuit board 9 so as to face each other, the optical axes thereof are not necessarily aligned. Therefore, the position and vertical and horizontal inclination angles of each of the light-emitting element 2 and the light-receiving element 3 are changed or adjusted so that the peak to peak voltage between the terminals 7 and 8 becomes maximum. Since each of the light-emitting element 2 and the light-receiving element 8 is mounted on the printed circuit board 9 by means of pin-like electrodes or leads 2L and 3L thereof, vertical inclination angle and horizontal inclination angle of each of the light-emitting element 2 and the light-receiving element 3 with respect to the printed circuit board 9 can be changed slightly by applying a force thereto. The pin-like leads 2L and 3L are soldered to the printed circuit board 9 in the conventional manner. After the completion of optical axes alignment, the printed circuit board 9, on which the above-mentioned various electrical parts have been mounted, is assembled with the casing 1*a*. The inner size of each of the recessed portions 12*a* and 13*a* is selected to be larger than the outer size of each of the light-emitting element 2 and the light-receiving element 3 so that the position and inclination angles of each of these elements 2 and 3 are not affected or changed by the recessed portions 12*a* and 13*a* when the elements 2 and 3 are respectively received in the corresponding recessed portions 12*a* and 13*a*. In other words, there is a gap between the inner wall of each of the recessed portions 12*a* and 13*a* and the outer surface of each of the light-emitting element 2 and the light-receiving element 3 in this first embodiment.

Spaces defined by the upper surface of the printed circuit board 9, the inner surface of the casing 1*a* above the printed circuit board 9, the slit plate 10 and by the light-emitting element 2 as well as the light-receiving element 3 are filled with transparent synthetic resin filling 11*a*, while spaces defined by the lower surface of the printed circuit board 9, the inner surface of the casing 1*a* below the printed circuit board 9, the above-mentioned various electrical parts, and by the terminals 6 to 8 are filled with a synthetic resin filling 11*b*. As the resin fillings 11*a* and 11*b*, an epoxy resin may be used.

The electrical circuit portion assembled in the casing 1*a* in the above-mentioned manner is fitted into a generally cylindrical bore (no numeral) of the body 23 as shown in FIG. 1, where the bore communicates with the fluid chamber 40. The casing 1*a* has a shoulder portion 50 along its periphery, and this shoulder portion is stepped as shown. The casing 1*a*, in which the electrical circuit has been incorporated, is fitted in the bore of the body 23 in such a manner that an O-ring 25 is interposed between the stepped shoulder 50 of the casing 1*a* and a corresponding given portion of the inner wall of the cylindrical bore. The O-ring 25 prevents the fluid in the fluid chamber 40 from leaking outside.

After the electrical circuit portion assembled in the casing 1 has been fitted into the cylindrical bore, a fixing plate 24 is attached to the bottom of the body 23 so that the electrical circuit portion is fixedly supported in the cylindrical bore. Namely, the fixing plate 24 is fixedly mounted on the bottom of the body 23 by means of screw(s) (no numeral). The fixing plate 24 has a through-hole so that the terminals 6 to 8 extending from the lower surface of the printed circuit board 9 as well as the leads 30 to 32 respectively connected to the terminals 6 to 8 pass therethrough. A space defined by the inner wall of the through-hole of the fixing plate 24 is filled with a suitable synthetic resin filling 29 such as an epoxy resin. Since the connecting portions between the terminals 6 to 8 and the leads 30 to 32 are all fixed by the synthetic resin filling 29, undesirable disconnection is prevented.

The above-described first embodiment of FIGS. 1 to 3 operates as follows: Namely, as fluid comes in through the inlet passage 14, the fluid is accelerated by the throttle nozzle 15, and thus the fluid having a relatively high flow speed hits the blades 16*a* to 16*d* of the blade wheel 16. As a result, the blade wheel 16 rotates at a speed proportional to the flow rate of the fluid passing through the fluid chamber 40 in the same manner as in various conventional flow rate transducers.

The light-shielding plates 17, which may be integrally formed with the body of the blade wheel 16 to rotate therewith, rotate in such a manner that each of the shielding plates 16 blocks the light beam from the light-emitting element 2. Accordingly, the light-receiving element 3 intermittently receives the light beam from the light-emitting element 2 causing the electrical circuit of FIG. 4 to generate a pulsating signal at the collector of the transistor 35, and this pulsating signal is derived via the terminal 7 and the lead 31. The pulsating signal is applied via a suitable waveform shaping circuit (not shown) to a pulse counter (not shown). The number of pulses per unit time is counted by the counter, so that the output signal of the counter represents the rotational speed of the blade wheel 16. Since the rotational speed of the blade wheel 16 substantially indicates the flow rate of the fluid passing through the fluid chamber 40, the output signal of the counter indicates the flow rate. This output signal may be used for displaying fuel consumption rate in the case that the fluid is gasoline for an internal combustion engine. Furthermore, such fuel consumption rate information may be applied to a control device, such as a microcomputer, which controls various operations of the engine.

Figure 5:
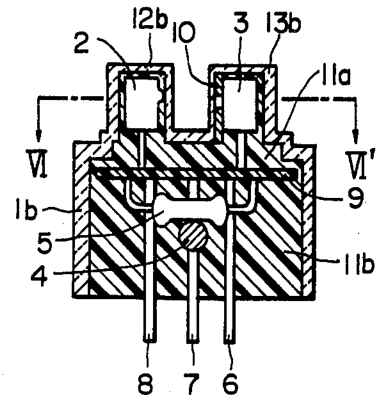
FIG. 5 is a schematic cross-sectional front view of the electrical circuit portion in a second embodiment of the flow rate transducer according to the present invention.
Figure 6:
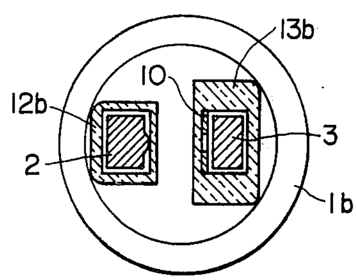
FIG. 6 is a schematic cross-sectional view of the electrical circuit portion taken along a line VI–VI' of FIG. 5.

Reference is now made to FIGS. 5 and 6 which show a second embodiment of the flow rate transducer according to the present invention. FIG. 5 shows only an electrical circuit portion assembled in a transparent casing 1*b* which corresponds to the casing 1*a* of the above-described first embodiment, and FIG. 6 is a cross-sectional view taken along a line VI–VI' of FIG. 5. The second embodiment differs from the first embodiment in that the size and shape of each of the recessed portions 12*b* and 13*b*, which respectively correspond to the recessed portions 12*a* and 13*a* of FIGS. 1 and 2, are arranged such that each of the light-emitting element 2 and the light-receiving element 3 is tightly received or fitted therein. In other words, there is almost no gap between the inner walls of each of the recessed portions 12*b* and 13*b* and the outer surface of each of the light-emitting element 2 and the light-receiving element 3. Furthermore, the horizontal cross-section, as shown in FIG. 6, of each of the recessed portions 12*b* and 13*b* is of rectangular shape so as to match the general contour of each of the light-emitting element 2 and the light-receiving element 3. Namely, each of the recessed portions 12*b* and 13*b* has a rectangular prism shape. The recessed portions 12*b* and 13*b* are arranged to face each other in such a manner that two parallel inner walls perpendicular to the light beam, of each of the rectangular prisms of the recessed portions 12*b* and 13*b* are parallel to each other.

With this arrangement, when the light-emitting element 2 and the light-receiving element 3 are respectively received and fitted in the corresponding recessed portions 12*b* and 13*b*, the vertical and horizontal inclination angles of each of the elements 2 and 3 are automatically corrected, if deviated from desired vertical and horizontal angles at which the optical axes of the light-emitting element 2 and the light-receiving element 3 are aligned. Such correction of inclination angles of each of the elements 2 and 3 can be effected because of the above-mentioned very small gap in each of the recessed portions 12*b* and 13*b*. The shape of the recessed portions 12*b* and 13*b* may be changed to the shapes of the light-emitting element 2 and the light-receiving element 3. However, cylindrical light-emitting element and light-receiving element are not suitable for the second embodiment since each of such elements is apt to rotate within the corresponding recessed portion.

From the above, it will be understood that no particular adjustment for optical axes alignment is needed in the second embodiment flow rate transducer because such alignment is effected by simply fitting the light-emitting element 2 and the light-receiving element 3 into the corresponding recessed portions 12*b* and 13*b*. Therefore, the manufacturing process of the flow rate transducer can be simplified, resulting in cost reduction. Although it has been described that the gap is very small, the recessed portion 13*b* for receiving the light-receiving element 3 has a space for installing the slit plate 10 in the same manner as in the first embodiment. Remaining structure of the second embodiment flow rate transducer may be the same as that of the first embodiment.

Figure 7:
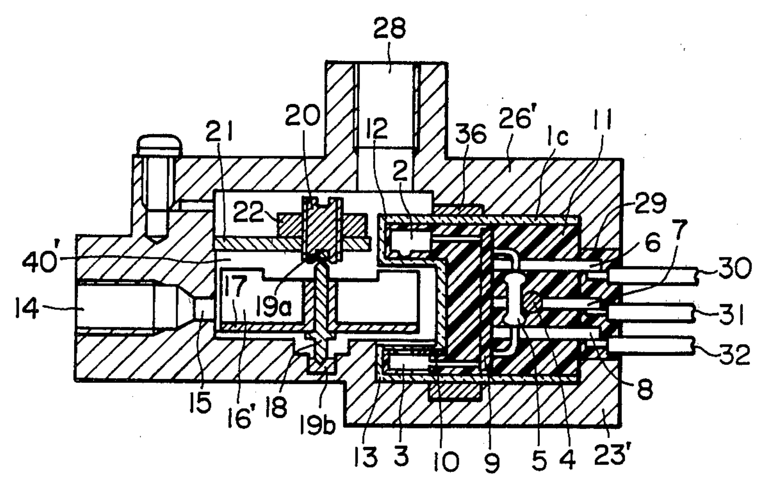
FIG. 7 is a schematic cross-sectional view of a third embodiment of the flow rate transducer according to the present invention.
Figure 8:
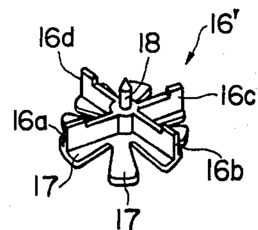
FIG. 8 is a schematic perspective view of the blade wheel of FIG. 7.

Reference is now made to FIGS. 7 and 8 which show a third embodiment of the flow rate transducer according to the present invention. As is shown in a cross-sectional front view of FIG. 7, the third embodiment differs from the first and second embodiments in that the light beam between the light-emitting element 2 and the light-receiving element 3 is perpendicular to the rotational plane of the blade wheel 16' which has structure different from those of the previous embodiments.

Namely, as best seen in FIG. 8, the blade wheel 16' does not have pieces or portions extending downward from the circular body thereof, while a plurality of slots (no numeral) are formed in the circular body. The slotted circular body functions as a plurality of light-shielding plates 17*a*. The electrical circuit portion is located so that the light-emitting element 2 is above the blade wheel 16', and the light-receiving element 3 is below the blade wheel 16' or vice versa. With this arrangement, the light beam from the light-emitting element 2 passes through the plurality of slots of the blade wheel 16' as it rotates. Since the blade wheel 16' does not have any portion extending downward from its body, the annular recess 42 of FIG. 1 is omitted from the third embodiment flow rate transducer.

In the third embodiment, the electrical circuit portion is located at a position opposite to the fluid inlet passage with respect to the fluid chamber 40' and therefore, the outlet passage 28 is located at the top lid 26' above the fluid chamber 40', and extends upwardly. Namely, the outlet passage 28 is integrally formed with the top lid 26'. The electrical circuit portion is fitted in a bore defined by both the body 23' of the flow rate transducer and the top lid 26', and a packing or an O-ring 36 is provided between the inner wall of the bore and the outer surface of the casing 1*c*, which does not have a shoulder. The electrical circuit portion is fitted in the bore so as to be interposed or sandwiched between the top lid 26' and the body 23'. As a result, a particular fixing means, such as the fixing plate 24 of FIG. 1 is unnecessary in this third embodiment. Remaining arrangements are substantially the same as those in previous embodiments. The recessed portions 12 and 13 of the casing 1*c* may be arranged in either way of the first or second embodiment. Namely, the recessed portions 12 and 13 may have size relatively larger than the size of the light-emitting element 2 and the light-receiving element 3 in the same manner as in the first embodiment, or substantially the same as the size of the elements 2 and 3 as in the second embodiment. Therefore, optical axes alignment may be performed in the same manner as described in connection with the previous embodiments.

Figure 9:
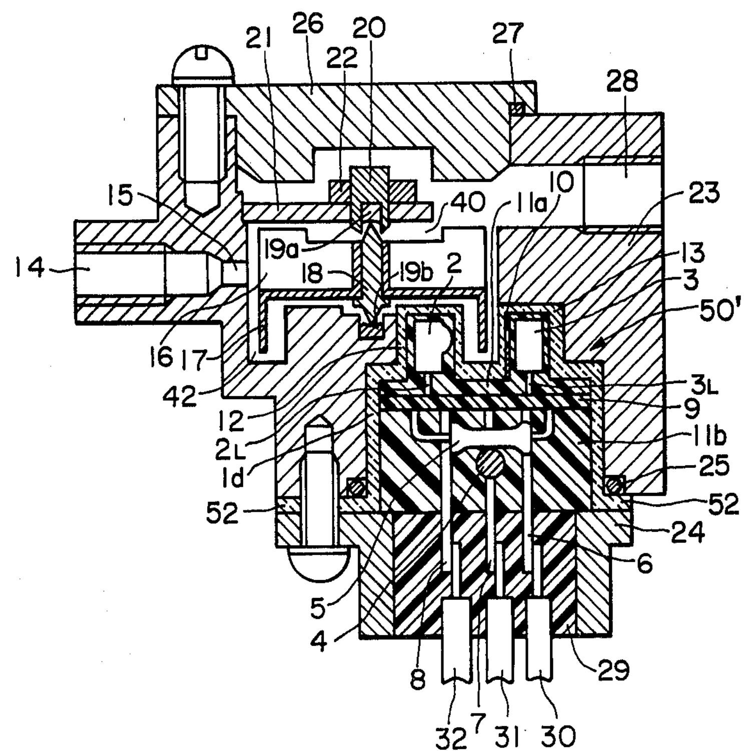
FIG. 9 is a schematic cross-sectional front view of a fourth embodiment of the flow rate transducer according to the present invention.

FIG. 9 illustrates a cross-sectional front view of a fourth embodiment of the flow rate transducer according to the present invention. The fourth embodiment of FIG. 9 is the same in construction as the first embodiment of FIGS. 1 to 3 except for the shape of the cylindrical casing 1*d* which corresponds to the cylindrical casing 1*a* of FIG. 1. Namely, the casing 1*d* comprises a flange portion 52 radially and outwardly extending from the open end of the casing 1*d,* while the shoulder 50′ of the casing 1*d* does not have a stepped portion. Accordingly, the O-ring 25 for seaing the fluid in the fluid chamber 40 is positioned between the upper surface of the flange 52 of the casing 1*d* and a corresponding portion of the body 23. Other structure of the fourth embodiment flow rate transducer is substantially the same as that of the first embodiment.

In the above first to fourth embodiments, although it has been described that the cylindrical casing 1*a,* 1*b,* 1*c* or 1*d* is made of a transparent material, the cylindrical casing may be made of an opaque material except for portions functioning as windows for the light beam.

Figure 10:
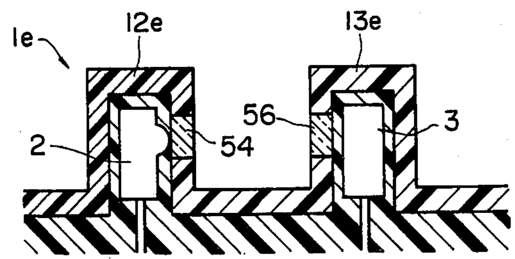
FIG. 10 is a schematic cross-sectional partial view of the electrical circuit portion in a fifth embodiment of the flow rate transducer according to the present invention.

Hence, reference is now made to FIG. 10 which shows a fifth embodiment of the flow rate transducer according to the present invention. FIG. 5 is an enlarged partial view of a casing 1*e* which may be used for any of the previous embodiments. The casing 1*e* has two recessed portions 12*e* and 13*e* for respectively receiving the light-emitting element 2 and the light-receiving element 3 in the same manner as in the previous embodiments. Most of the portions of the cylindrical casing 1*e* is formed of an opaque material, such as colored synthetic resin, while a given portion 54 or 56 in each of the recessed portions 12*e* and 13*e* is formed of a transparent material. The transparent portions 54 and 56 function as windows so that the light beam from the light-emitting element 2 is transmitted via the transparent windows 54 and 56 to the light-receiving element 3. The size or diameter of the transparent window 56 of the recessed portion 13*e* receiving the light-receiving element 3 therein is selected so that the transparent window 56 per se functions as a slit. With this provision, the slit plate 10 employed in the previous embodiments may be unnecessary.

In the above previous embodiments, although it has been described that the light beam from the light-emitting element 2 is directly received by the light-receiving element 3, the other type of light transmission, namely aforementioned reflecting type, may be adopted.

Figure 11:
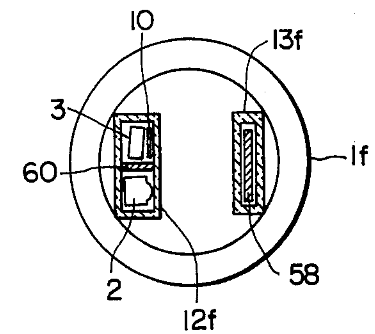
FIG. 11 is a schematic cross sectional view of the electrical circuit portion in a sixth embodiment of the flow rate transducer according to the present invention.

Hence, reference is now made to FIG. 11 which shows a cross-sectional top view of an electrical circuit portion used in a sixth embodiment in which a light beam from the light-emitting element 2 is reflected at a mirror 58. The cross-sectional view of FIG. 11 illustrates the electrical circuit portion in the casing 1*f* in the same manner as FIGS. 2 and 6. Two recessed portions 12*f* and 13*f* are respectively formed in a similar manner to the recessed portions 12*a* to 12*e* and 13*a* to 13*e* of the previous embodiments. The first recessed portion 12*f* has a partition 60 which bisects the rectangular prism defined by the first recess 12*f.* Therefore, two cavities (no numeral) are defined in the first recessed portion 12*f,* and the light-emitting element 2 and the light-receiving element 3 are respectively received in these cavities. The slit plate 10 is placed in front of the light-receiving element 3 in the same manner as in the previous embodiments.

In the other recessed portion 13*f* is received a mirror 58 so that the light beam from the light-emitting element 2 is reflected thereat to be transmitted to the light-receiving element 3. The mirror 58 is mounted on the printed circuit board 9 by means of flexible wires (not shown) soldered to the printed circuit board 9. The blade wheel 16 (not shown in FIG. 10) is arranged so that the aforementioned light-shielding plates 17 intermittently blocks at least one of two light-beams, i.e. one from the light-emitting element 2 and the reflected light beam from the mirror 58. Each of the recessed portions 12*f* and 13*f* may have size such that the light-emitting element 2 and the light-receiving element 3 as well as the mirror 58 can slightly move to change their vertical and horizontal inclination angles as described in connection with the first embodiment. In this case, the optical axes are aligned to cause the light-receiving element 3 to receive the reflected light beam properly before the light-emitting element 2, the light-receiving element 3 and the mirror 58 are received in the corresponding recessed portions 12*f* and 13*f.* However, if desired, the recessed portions 12*f* and 13*f* may be arranged in the same manner as in the second embodiment so that optical axes alignment can be automatically performed when the casing 1*f* is attached to the printed circuit board 9. Furthermore, the above-described features of the third, fourth and/or fifth embodiments may be adopted to the fifth embodiment.

From the foregoing description, it will be understood that optical axes alignment can be simply and readily performed in the flow rate transducer according to the present invention. After the completion of the optical axes alignment, the light-emitting element 2 and the light-receiving element, and furthermore the mirror 58 in the sixth embodiment of FIG. 11, are all fixed by means of a synthetic resin, and therefore the adjusted optical axes will not change for a long period of time. The above-described embodiments are just examples of the present invention, and therefore, it will be apparent for those skilled in the art that many modifications and variations may be made without departing from the spirit of the present invention.

What is claimed is:

1. A flow rate transducer for producing an electrical signal indicative of flow rate of fluid, comprising:

(a) a housing defining a fluid chamber which communicates with an inlet passage and with an outlet passage;

(b) a blade wheel rotatably mounted in said fluid chamber, and having a plurality of light-shielding plates;

(c) a light-emitting element arranged at one side of a given point of the locus of said light-shielding plates;

(d) a light-receiving element arranged adjacent to said light-emitting element;

(e) means for reflecting a light beam from said light-emitting element so that the reflected light beam is received by said light-receiving element;

(f) means for carrying said light-emitting element, said light-receiving element and the reflecting means thereon; and (g) a casing having two recessed portions for respectively receiving, in the first recessed portion, said light-emitting element and said light-receiving element, and in the second recessed portion, said reflecting means, each of said recessed portions having a transparent portion so that light transmission from said light-emitting element via said reflecting means to said light-receiving element is effected therethrough, said casing being fixedly connected to the carrying means, and being embedded in a bore made in said housing.

2. A flow rate transducer as claimed in claim 1, wherein, said light-shielding plates comprise a plurality of pieces arranged at the circumference of said blade wheel, and extending axially with respect to the center shaft of said blade wheel.

3. A flow rate transducer as claimed in claim 2, wherein said fluid chamber comprises an annular recess at the bottom thereof so that the axially extending light-shielding plates pass through an annular space defined by said annular recess.

4. A flow rate transducer as claimed in claim 1, wherein said light-shielding plates comprise a plurality of pieces arranged radially with respect to the center shaft of said blade wheel.

5. A flow rate transducer as claimed in claim 1, wherein said casing is generally cylindrically shaped.

6. A flow rate transducer as claimed in claim 1, wherein said casing is made of a transparent material.

7. A flow rate transducer as claimed in claim 1, further comprising a slit plate received in one of said recessed portions.

8. A flow rate transducer as claimed in claim 1, wherein said casing is made of an opaque material except for given portions of said recessed portions, said given portions being made of a transparent material.

9. A flow rate transducer as claimed in claim 1, wherein said casing has a shoulder portion along the circumference thereof.

10. A flow rate transducer as claimed in claim 9, wherein said shoulder portion comprises a stepped portion for placing a fluid sealing means thereon.

11. A flow rate transducer as claimed in claim 1, wherein said casing has an open end and a flange portion extending radially and outwardly from said open end.

12. A flow rate transducer as claimed in claim 1, wherein said light-emitting element, said light-receiving element and said reflecting means are so arranged that a light beam from said light-emitting element to said reflecting means and a light beam from said reflecting means to said light-receiving element are perpendicular to a center shaft of said blade wheel.

13. A flow rate transducer as claimed in claim 1, wherein said light-emitting element, said light-receiving element and said reflecting means are so arranged that a light beam from said light-emitting element to said reflecting means and a light beam from said reflecting means to said light-receiving element are parallel to a center shaft of said blade wheel.

14. A flow rate transducer as claimed in claim 1, wherein said means for carrying said light-emitting element, said light-receiving element and said reflecting means is a printed circuit board, each of said light-emitting element and said light-receiving element having pin-like leads soldered to said printed circuit board, said reflecting means being mounted on said printed circuit board by means of flexible wires soldered to said printed circuit board.

15. A flow rate transducer as claimed in claim 14, further comprising a plurality of terminals extending from said printed circuit board.

16. A flow rate transducer as claimed in claim 1, further comprising a synthetic resin filling filled in said recessed portions so that said light-emitting element, said light-receiving element and said reflecting means are fixedly supported therein.

17. A flow rate transducer as claimed in claim 1, further comprising a synthetic resin filling filled in said casing so that said carrying means is embedded in said filling to be fixedly supported in said casing.

18. A flow rate transducer as claimed in claim 1, further comprising various electrical parts for constituting an electrical circuit causing said light-emitting element to emit light, and responsive to an output signal from said light-receiving element.

19. A flow rate transducer as claimed in claim 1, further comprising a fixing plate for fixedly supporting said casing with respect to said housing.

20. A flow rate transducer as claimed in claim 1, wherein said housing comprises a body and a top lid fixedly connected to said body.

21. A flow rate transducer as claimed in claim 20, wherein each of said body and top lid of said housing has a recessed portion so that said bore of said housing is defined by the recesses of said body and top lid.

* * * * *